(12) United States Patent
Hahn et al.

(10) Patent No.: US 7,996,579 B2
(45) Date of Patent: Aug. 9, 2011

(54) APPARATUS, METHODS, AND COMPUTER-CODE FOR HANDLING AN IMPENDING DECOUPLING BETWEEN A PERIPHERAL DEVICE AND A HOST DEVICE

(75) Inventors: Yehuda Hahn, Ofra (IL); Mordechai Teicher, Hod Hasharon (IL); Itzhak Pomerantz, Kfar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 0 days.

(21) Appl. No.: 11/798,424

(22) Filed: May 14, 2007

(65) Prior Publication Data

US 2007/0266194 A1 Nov. 15, 2007

Related U.S. Application Data

(60) Provisional application No. 60/747,195, filed on May 14, 2006.

(51) Int. Cl.
*G06F 13/00* (2006.01)
*G06F 12/00* (2006.01)
*G06F 15/00* (2006.01)

(52) U.S. Cl. ............ 710/15; 710/302; 710/304; 710/16; 710/17; 710/18; 710/19; 710/64; 710/72; 711/115; 711/135; 702/188

(58) Field of Classification Search ............ 710/15–19, 710/62, 64, 100, 302, 304, 72; 714/1–4; 702/188; 711/115, 135

See application file for complete search history.

(56) References Cited

U.S. PATENT DOCUMENTS

| | | | | |
|---|---|---|---|---|
| 5,564,024 | A | * | 10/1996 | Pemberton ................ 710/302 |
| 5,664,119 | A | * | 9/1997 | Jeffries et al. ............... 710/302 |
| 5,758,101 | A | * | 5/1998 | Pemberton ................ 710/302 |
| 5,768,541 | A | * | 6/1998 | Pan-Ratzlaff ............... 710/304 |
| 6,005,769 | A | * | 12/1999 | Cho ........................... 361/686 |
| 6,098,127 | A | * | 8/2000 | Kwang ......................... 710/62 |
| 6,134,615 | A | * | 10/2000 | Chari et al. ................. 710/302 |
| 6,138,194 | A | * | 10/2000 | Klein et al. ................. 710/302 |
| 6,141,711 | A | * | 10/2000 | Shah et al. .................. 710/302 |
| 6,225,711 | B1 | | 5/2001 | Gupta et al. |
| 6,836,212 | B2 | * | 12/2004 | Sawinski ................ 340/539.23 |
| 6,928,504 | B2 | * | 8/2005 | Peacock ..................... 710/302 |
| 7,234,014 | B2 | * | 6/2007 | Molander et al. ............ 710/302 |
| 7,277,011 | B2 | * | 10/2007 | Estakhri ..................... 340/540 |
| 7,490,199 | B2 | * | 2/2009 | Camiel ....................... 711/115 |
| 2003/0023410 | A1 | * | 1/2003 | Roth .......................... 702/188 |
| 2004/0117651 | A1 | * | 6/2004 | Little et al. ................. 713/200 |
| 2007/0162594 | A1 | * | 7/2007 | Henry et al. ................ 709/224 |

* cited by examiner

*Primary Examiner* — Tammara Peyton
(74) *Attorney, Agent, or Firm* — Vierra Magen Marcus & DeNiro LLP

(57) ABSTRACT

Apparatus, methods and computer-code are disclosed where an impending decoupling between a peripheral device and a host is detected. In some embodiments, in response to the detected impending disconnection, a user alert signal is generated. In some embodiments, an 'onboard detector' that is associated with housing of the peripheral device and operative to detect the impending disconnection is provided. In some embodiments, the user alert signal is generated in accordance with inter-device data flow between the host and the peripheral device. Exemplary peripheral devices include but are not limited to transient storage devices such as a USB flash drives (UFD).

14 Claims, 12 Drawing Sheets

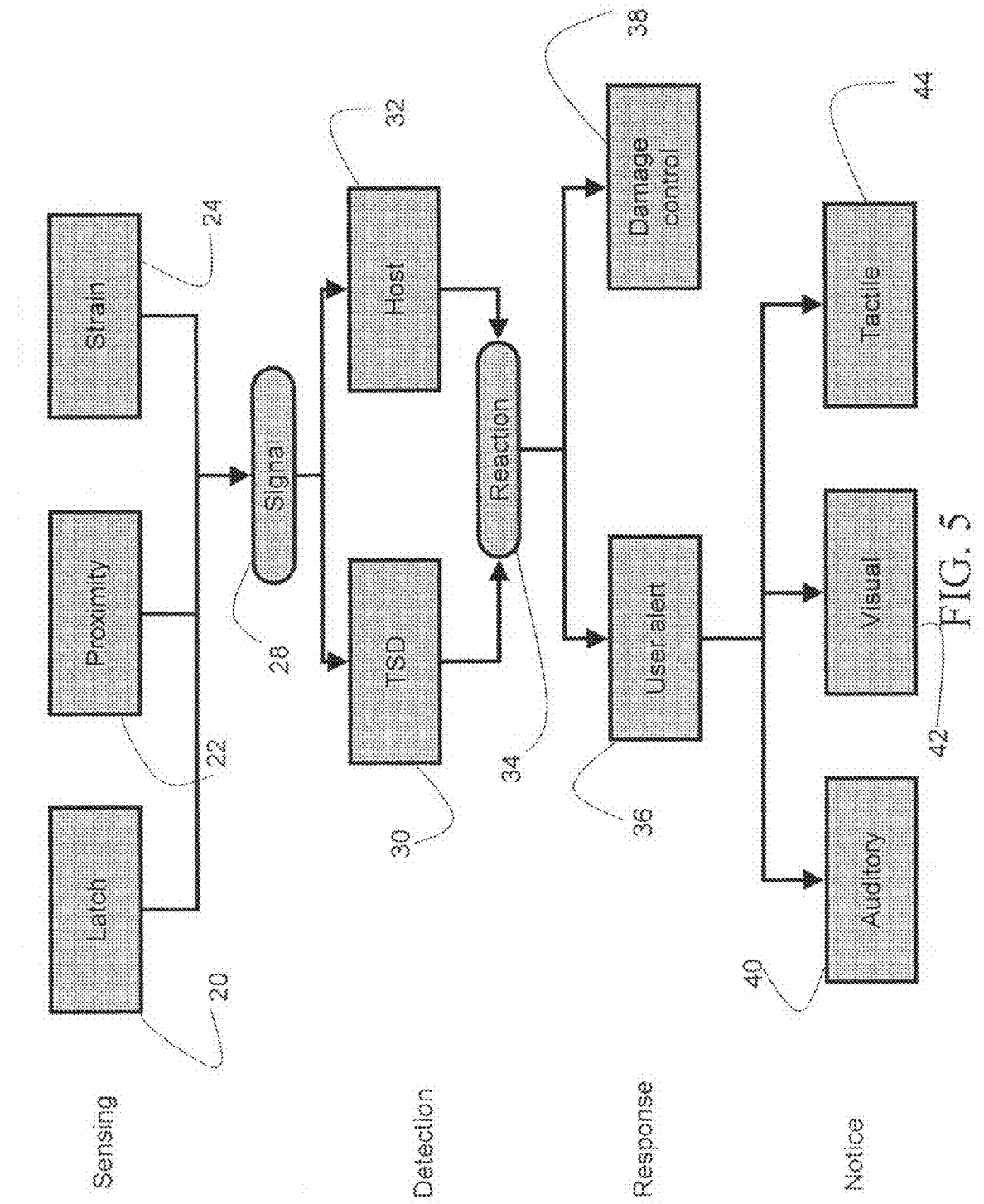

APPARATUS, METHODS, AND COMPUTER-CODE FOR HANDLING AN IMPENDING DECOUPLING BETWEEN A PERIPHERAL DEVICE AND A HOST DEVICE

CROSS-REFERENCE TO RELATED APPLICATIONS

This patent application claims the benefit of U.S. Provisional Patent Application No. 60/747,195 filed May 14, 2006.

FIELD OF THE INVENTION

The present invention relates to techniques for handling (i.e. detecting and/or reacting to) an impending decoupling between a transient peripheral device (for example, a transient storage device) and a host device.

BACKGROUND AND RELATED ART

Unscheduled detachment of a transient peripheral device (for example, a transient storage device) from a host computer during file transfer is a likely event in the art of digital computing, and is liable to cause damage to the data in the computer and/or in the peripheral device.

For the present disclosure, a "Transient Peripheral Device" refers to a reversibly attachable peripheral device—i.e. either reversibly attachable to a port (i.e. plug or socket) of the housing of the host device or reversibly attachable via some sort of mediating external cable or external cradle. Transient peripheral devices often communicate with their hosts using a 'master-slave' communications protocol that has a 'host side' and a 'peripheral side.' One example of such a protocol is the USB protocol.

One example of a "Transient Peripheral device" is a 'Transient Storage Device' (TSD)—i.e. a transient peripheral device that includes non-volatile memory on which data received from the host may be stored and subsequently read back to the host. One example of a TSD is a UFD (USB flash drive) such as the Cruzer® flash drive from SanDisk Corporation (Milpitas, Calif.). USB flash drives provide a convenient medium for the storage of user files and for the transfer of these files between different computers.

One type of damage caused by such unscheduled detachment is data corruption in the file transfer target device. Another type of damage is loss of data due to a wrong user assumption that data has been backed up on the other device, when it has not. The Windows operating system available from Microsoft Corporation offers interactive means for preventing such damage, however this means does not protect the system from accidental premature withdrawal of a TSD.

Typically, a TSD is detached from a computer manually—the user grasps the TSD using his hand and pulls it out. This gesture of pulling out the TSD comprises a sequence of movements, some of which take place before the actual detachment occurs.

SUMMARY

It is now disclosed for the first time a technique where (i) an impending disconnection between a host device and a peripheral device is detected and (ii) in response to the detected impended disconnection, a user alert signal is generated.

Furthermore, it is now disclosed for the first time that it may be desirable to provide the aforementioned user alert signal only in certain situations. In one example: (i) when it is assessed that data flows from the host to the peripheral (or vice versa) at the time that the impending disconnection is detected, the alert signal is generated; and (ii) otherwise, no alert signal (or a different type of alert signal such as a 'muted alert' signal) is provided. The presence of the aforementioned 'inter-device' data flow may, for example, indicate an elevated risk to data and may thus warrant an alert signal, or a 'stronger' alert signal.

Thus, according to some aspects of the present invention, it is now disclosed for the first time a transient non-volatile storage device including: a) a non-volatile memory for data storage; b) a device port for peripheral-host coupling with a host device and for data exchange between the non-volatile memory and the coupled host device; and c) an onboard detector that is operative, when the transient non-volatile storage device is coupled with the host device via the device port, to detect an indication of an impending decoupling between the transient non-volatile storage device and the host device.

According to some embodiments, the storage device further includes: d) a user-alert mechanism operative to trigger a user alert of the detected impeding decoupling in response to the detection.

According to some embodiments, the user-alert mechanism is operative to trigger the user alert in accordance with a flow of data from the host device to the non-volatile memory.

According to some embodiments, the device further includes d) a signal forwarding mechanism operative to forward the indication of the impending decoupling to the host device.

According to some embodiments, the signal forwarding mechanism is operative to carry out the forwarding in accordance with a flow of data from the host device to the non-volatile memory (i.e. to forward the indication selectively).

According to some embodiments, the onboard detector is operative to carry out the detecting in accordance with a flow of data from the host device to the non-volatile memory.

According to some embodiments, the onboard detector is operative to detect the indication by detecting a change of state of an electric switch.

According to some embodiments, the onboard detector is operative to detect at least one of: i) an approach of a physical object to one or more of: A) the non-volatile storage device; and B) a coupling location between the non-volatile storage device and the host device; and ii) a proximity of a physical object to one or more of: A) the non-volatile storage device; and B) the coupling location.

According to some embodiments, the onboard detector includes at least one sensing element selected from the group consisting of a proximity detector, a stress sensor, a strain sensor, an electromechanical sensor, a piezoelectric transducer, a thermal sensor, and an optical sensor.

According to some embodiments, the onboard detector is operative to detect at least one of a mechanical motion parameter, a mechanical stress parameter, a mechanical strain parameter, and an applied pressure parameter.

It is now disclosed for the first time a transient peripheral device including: a) a device port for peripheral-host coupling with a host device and for data exchange with the coupled host device; b) an onboard detector that is operative, when the transient peripheral device is coupled with the host device via the device port, to detect an indication of an impending decoupling between the transient peripheral device and the host device; and c) at least one handling mechanism selected from the group consisting of: i) a user-alert mechanism operative to trigger a user alert of the detected impeding decoupling in accordance; and ii) a signal forwarding mechanism operative to forward, to the host the detected indication.

According to some embodiments, the user-alert mechanism is operative to trigger the user alert in accordance with a flow of data from the host device to the transient peripheral device via the device port.

According to some embodiments, the signal forwarding mechanism is operative to carry out the forwarding in accordance with a flow of data from the host device to the transient peripheral device via the device port.

According to some embodiments, the onboard detector is operative to carry out the detecting in accordance with a flow of data from the host device to the transient peripheral device via the device port.

It is now disclosed for the first time a computer readable storage medium having computer readable code embodied in the computer readable storage medium, the computer readable code comprising instructions for a host device that is peripheral-host coupled to a transient peripheral device to: a) effect a data exchange operation with the coupled transient peripheral device; and b) upon handling of an indication of an impending decoupling between the transient peripheral device and the host device, and in accordance with a flow of data from the host device to the coupled transient peripheral device, triggering a user alert of the impeding decoupling.

It is now disclosed for the first time a computer readable storage medium having computer readable code embodied in the computer readable storage medium, the computer readable code comprising instructions for a host device that is peripheral-host coupled to a transient peripheral device to: a) effect a data exchange operation with the coupled transient peripheral device; and b) upon receiving, from the coupled transient peripheral device, of an indication of an impending decoupling between the transient peripheral device and the host device, triggering a user alert of the impeding decoupling.

It is now disclosed for the first time a host device including: a) a host-side port for peripheral-host coupling with a transient peripheral device to allow at least one data exchange via the host-side port between the host device and the coupled transient device; and b) an alert mechanism operative, i) upon handling of an indication of an impending decoupling between the transient peripheral device and the host device; and ii) in accordance with a flow of data from the host device to the coupled transient peripheral device, to trigger a user alert of the impending decoupling.

It is now disclosed for the first time a host device including: a) a host-side port for peripheral-host coupling with a transient peripheral device to allow at least one data exchange via the host-side port between the host device and the coupled transient device; and b) an alert mechanism operative, upon receiving, via the host-side port, from the transient peripheral device, of an indication of an impending decoupling between the transient peripheral device and the host device, to trigger a user alert of the impending decoupling.

It is now disclosed for the first time a method of operating a transient non-volatile storage device, the method including: a) effecting at least one data exchange operation with a host device that is peripheral-host coupled with the transient non-volatile storage device; and b) at the transient non-volatile storage device, detecting an indication of an impending decoupling between the transient non-volatile storage and the coupled host device.

According to some embodiments, the method further includes c) in response to the detecting, triggering a user alert of the detected impeding decoupling.

According to some embodiments, the user alert is triggered (i.e. selectively) in accordance with a flow of data from the host device to the transient non-volatile memory storage device.

According to some embodiments, the method further includes: d) sending an indication of the impending decoupling from the transient non-volatile storage device to the host device.

According to some embodiments, the sending is carried out in accordance with a flow of data from the host device to the transient non-volatile memory storage device.

According to some embodiments, the onboard detector is operative to carry out the detecting in accordance with a flow of data from the host device to the non-volatile memory.

It is now disclosed for the first time a method of operating a transient peripheral device, the method comprising: a) effecting at least one data exchange operation with a host device that is peripheral-host coupled with the peripheral device; and b) at the transient non-volatile storage device, detecting an indication of an impending decoupling between the transient non-volatile storage and the coupled host device.

It is now disclosed for the first time a system comprising: a) a host device; b) a transient peripheral device that is coupled with the host device, c) a detector operative to detect an indication of an impending decoupling between the transient non-volatile storage device and the host device; and d) a user-alert mechanism operative to trigger a user alert of the detected impeding decoupling in response to the detection.

According to some embodiments, the detector resides at least in part on the peripheral device.

According to some embodiments, user-alert mechanism resides at least in part on said host device.

According to some embodiments, the user-alert mechanism detector resides at least in part on the peripheral device.

Exemplary Techniques for Detecting the Impending Disconnection

In one embodiment of the present invention, the TSD is packaged so that it has a mechanical latch that must be manually released before the TSD can be extracted from the host computer. In this embodiment, the mechanical operation of the latch creates an electric signal, typically by closing or opening an electric switch that indicates to the host computer that the TDS is about to be detached.

In another embodiment of the present invention, the TSD device is equipped with a capacitance switch, such as described in U.S. Pat. No. 6,225,711, to detect a change in the capacitance between an isolated conductive on the TSD and the ground. An attempt to touch the TSD with the hand activates a trigger alerting the TSD of the approaching detachment.

In yet another embodiment of the present invention, the TSD device is equipped with a sensitive strain gauge or a piezoelectric transducer, capable of sensing pressure applied to the body of the TSD, or a stress that indicates an intention to grab it and pull it out of its socket. Such stress or signal indicates that a hand is touching the TSD.

Exemplary Responses to the Detected Impending Disconnection

As noted above, in response to the detected impending disconnection or 'decoupling', a user alert signal may be generated to warn the user.

Thus, in some embodiments, the alert signal will be provided by an onboard 'alert mechanism' on the peripheral device.

Alternatively or additionally, the alert signal will be provided via the host device. In one example, this alert signal may be similar to a response to an 'orderly' request for detachment (i.e. where the user announces the keyboard or mouse) as provided by the "Safely remove hardware" feature of Microsoft Windows XP operating systems. The user can then trigger said process by deliberately touching the TSD, instead of by seeking an icon on the screen and clicking on it.

In some embodiments, the 'user alert' may be a sensory alert—for example a beep and/or a tactile vibration of the housing of the peripheral device and/or a graphic flash on the computer screen—advising the user against carrying out the detachment of the TSD from the computer.

In some embodiments of the present invention, the user alert may be provided by having the operating system warn the user of impending data loss and prompt the user to save any open documents by presenting a suitable message on the screen and prompting the user to respond.

Optionally, one or more additionally operations may be carried out in response to the detected impending disconnection.

In some embodiments of the invention, the response will include carrying out one or more damage reduction operations, such as closing open connections and preparing the host environment for the forthcoming termination of the device connection.

Alternatively or additionally, the operating system may flush (a common technical term, meaning—instantly saves all the information kept in the cache into a safe location on the disk) all data to the device, prioritizing open files that may result in potential corruption. In this embodiment, the operating system also marks the file systems on the device as "dirty", warning the next host that connects to the device to check the consistency of files and file system structures before using the device.

These and further embodiments will be apparent from the detailed description and examples that follow.

BRIEF DESCRIPTION OF THE DRAWINGS

FIG. 5 shows a flowchart of an exemplary detection process of an impending detachment.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the invention is to cover all modifications, equivalents and alternatives falling within the spirit and scope of the present invention. As used throughout this application, the word "may" is used in a permissive sense (i.e., meaning "having the potential to"), rather than the mandatory sense (i.e. meaning "must").

DETAILED DESCRIPTION OF EMBODIMENTS

The present invention will now be described in terms of specific, example embodiments. It is to be understood that the invention is not limited to the example embodiments disclosed. It should also be understood that not every feature of the presently disclosed apparatus and technique for alerting a user in response to a detected impending decoupling between a host and a peripheral is necessary to implement the invention as claimed in any particular one of the appended claims. Various elements and features of devices are described to fully enable the invention. It should also be understood that throughout this disclosure, where a process or method is shown or described, the steps of the method may be performed in any order or simultaneously, unless it is clear from the context that one step depends on another being performed first.

Peripheral-Side Detection of an Impending Decoupling

Figure 1:
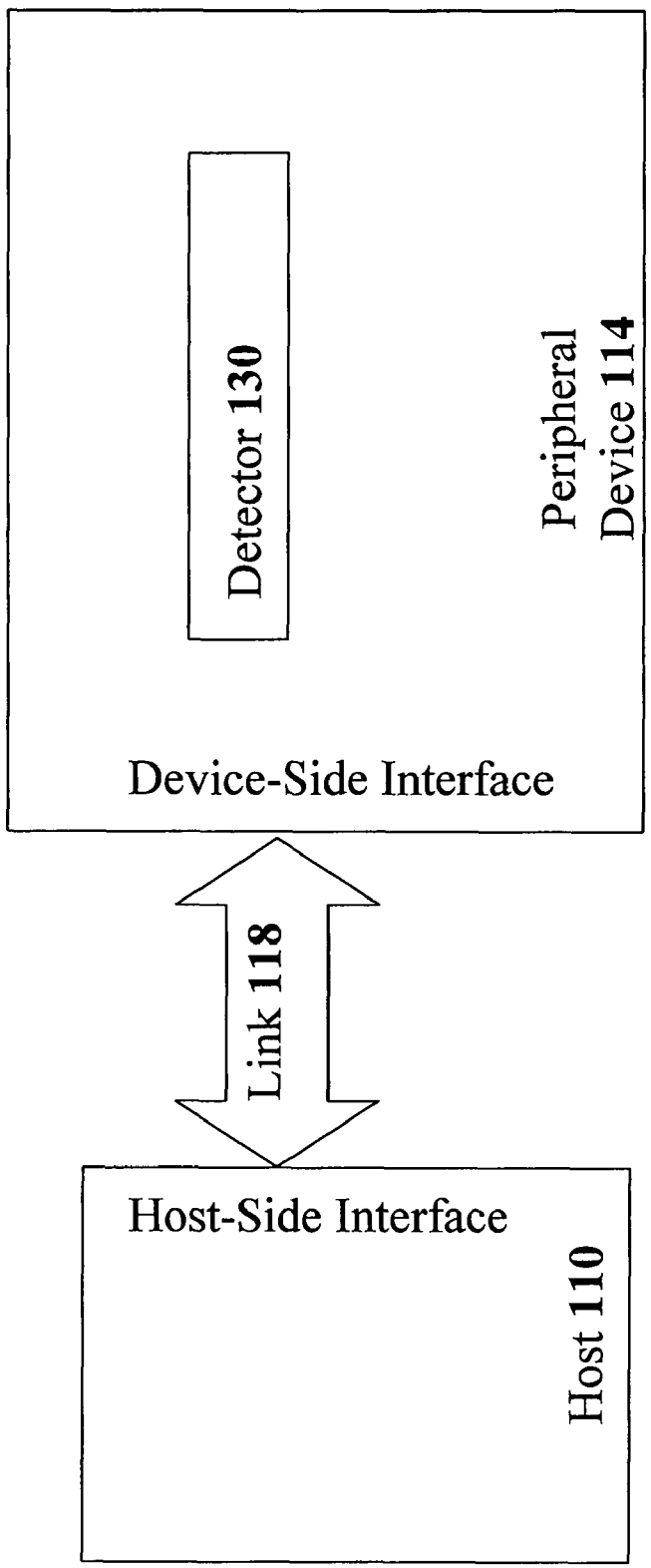
FIGS. 1-3 provide diagrams of an exemplary system including a host and a peripheral device having an onboard detector for detecting an impending decoupling between the host and the peripheral device.

FIG. 1 shows an exemplary system including a host device 110 coupled to a transient peripheral device 114. The host and peripheral device are 'coupled' via link 118 (for example, directly or via an external cable or cradle) so that data flows via a 'wired connection' between the two devices. Optionally, the peripheral device 114 receives power from the host 110 device via link 118.

Host 110 and peripheral device 114 communicate with each other via link 118 using a 'master-slave' protocol where the host 110 device plays the role of the 'host' or 'master' and peripheral device 114 plays the role of 'peripheral' or 'slave.'

For the present disclosure, a 'host' is a device operative to communicate with a 'peripheral' device according to the 'host role' or 'master role' defined by a master-slave protocol. A 'peripheral' device is operative to adopt the 'peripheral role' or 'slave role' defined by the master-slave protocol when communicating with a 'host'. One example of a 'peripheral' device is a transient non-volatile storage device.

For the present disclosure, when a 'host' and a 'peripheral' are 'coupled' (i.e. including but not limited to a transient non-volatile storage device): (i) they are physically connected via a 'wired connection' so that data flows via the 'wired connection' between the host and peripheral; (ii) they are configured to communicate using a 'master-slave' protocol—i.e. the host is configured to communicate with the peripheral in the 'host' or master role defined by the protocol and the peripheral (for example, a transient non-volatile storage device) is configured to communicate with the host in the 'slave' or peripheral role defined by the protocol.

For the present disclosure, a 'peripheral-host' coupling refers to an inter-device coupling where, upon coupling, the host and peripheral are operative to communicate with each other using a 'master-slave protocol' such that the 'peripheral' device plays the role of the peripheral and the 'host' plays the role of the host according to the rules of the 'master-slave' protocol.

Peripheral device 114 includes an 'onboard detector 130' operative to detect an impending decoupling or disconnection between the peripheral device 114 and the host 110. The 'onboard' detector 130 i.e. located within and/or on the housing of the peripheral device. Exemplary 'onboard detectors' 130 include but are not limited to a so-called latch detector 20 (an example of which is described with reference to FIGS. 6A-6B), a proximity sensor 22 (an example of which is described with reference to FIG. 7), and a strain sensor 24 (an example of which is described with reference to FIG. 8).

For the present invention, the term 'impending decoupling' is synonymous with an 'impending disconnection' or 'impending disconnecting'—i.e. referring to an impending loss of 'wired' electrical connectivity between the peripheral and the host.

The onboard detector is operative to detect the impending disconnection at a time when the peripheral device 114 is coupled with the host—i.e. at the time when the peripheral device 114 is operative to communicate with the host 110 as a 'slave' according to the master-slave protocol.

Figure 2:
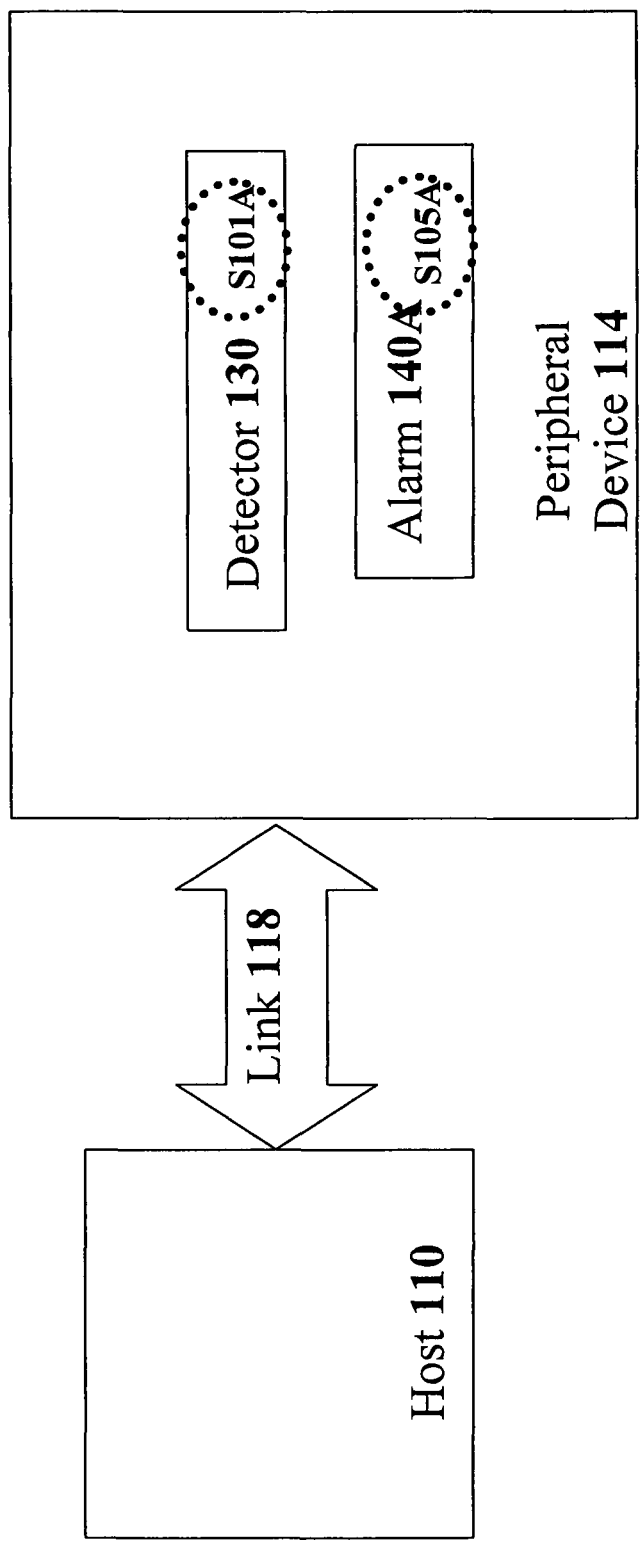

FIG. 2 describes an exemplary system and method for handling a detected impending decoupling (i.e. loss of electrical and logical connectivity) between the peripheral 114 and the host 110. In the example, the peripheral device 114 also includes an onboard alert mechanism 140A.

Thus, in the example of FIG. 2, the onboard detector 130 detects S101A the impending decoupling, and in response to the detected impending decoupling, onboard user alert mechanism 140A is triggered to produce one or more user alerts.

Figure 3:
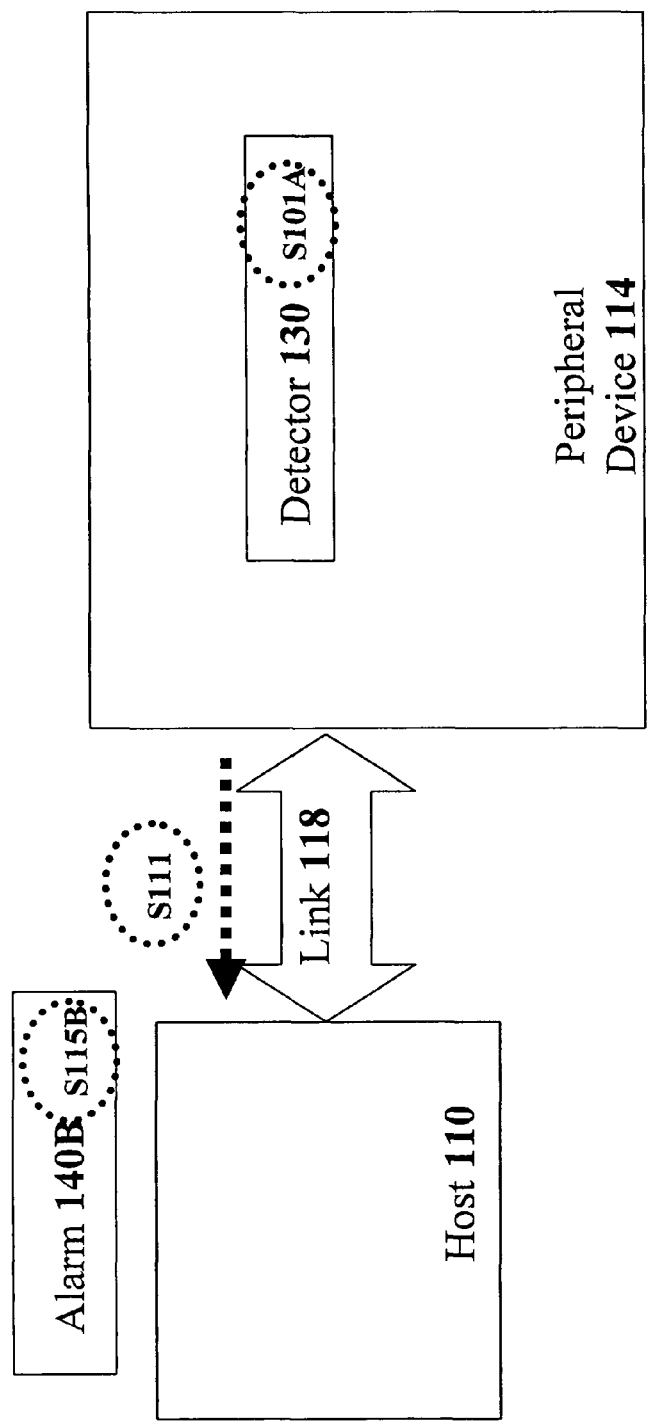

FIG. 3 relates to the case where the alert mechanism is not an onboard alert mechanism of the peripheral, but rather resides either on the host and/or one another device separate from the host and the peripheral device. Thus, in the example of FIG. 3, in response to the detected S101A impending disconnection, a signal indicative of the impending disconnection is forwarded S111 to the host device, thereby triggering alerting mechanism 140B, which produces the user alert 115B.

Onboard alert mechanism 140A and/or alert mechanism 140B (i.e. which is triggered via the host 110) is operative to produce one or more user alert signals. Exemplary alert signals include but are not limited to (i) a sound alert such as a beep (ii) a tactile vibration and/or a (iii) a visual alert such as a graphic flash on a display screen)

Conditional Alerts in Accordance with Inter-Device Dataflow

In some embodiments, it is noted it may be cumbersome for the user alert to be triggered every time that the peripheral device 114 is mechanically disconnected from the host (i.e. to decouple from the host 110).

In particular, and not wishing to be bound by theory, it is noted there are certain situations where the mechanical decoupling of the peripheral 114 from the host 110 is 'legitimate' and 'desired'—for example, when the user is legitimately finished using the device 114 and wants to decouple the peripheral 114 from the host 110. In these situations, the alert may be superfluous and may even annoy the user. On the other hand, there are other situations, where the decoupling is 'premature' (for example, if data is still being transferred between devices). In these situations, it may be desired to warn the user that decoupling is undesirable—for example, to allow for the user to abort the physical activity of mechanical decoupling of the peripheral 114 from the host 110.

Thus, in one particular example, where the peripheral or slave device is a non-volatile memory device (for example, a UFD), only if data is being received from the host and written into the non-volatile memory will a user alert be triggered. In some embodiments, this can reduce the likelihood of 'unnecessary' user alerts every time the user disconnects the peripheral (the UFD in this example) from the host. Thus, if data is not being sent from the host to the non-volatile memory device (i.e. for storage in the non-volatile memory), it may not be necessary to trigger an alert, because the 'pre-mature' decoupling may not risk any data being copied from the host. In this case, no user alert (or alternatively, an alert signal of lesser 'magnitude') would be generated if no data is being from the host to the non-volatile memory device for storage, or if only 'less important' data is sent. This may reduce the likelihood of 'overburdening' the user whenever the user 'illegally' detaches the device without first sending a 'detach device' command to the host.

Figure 4A:
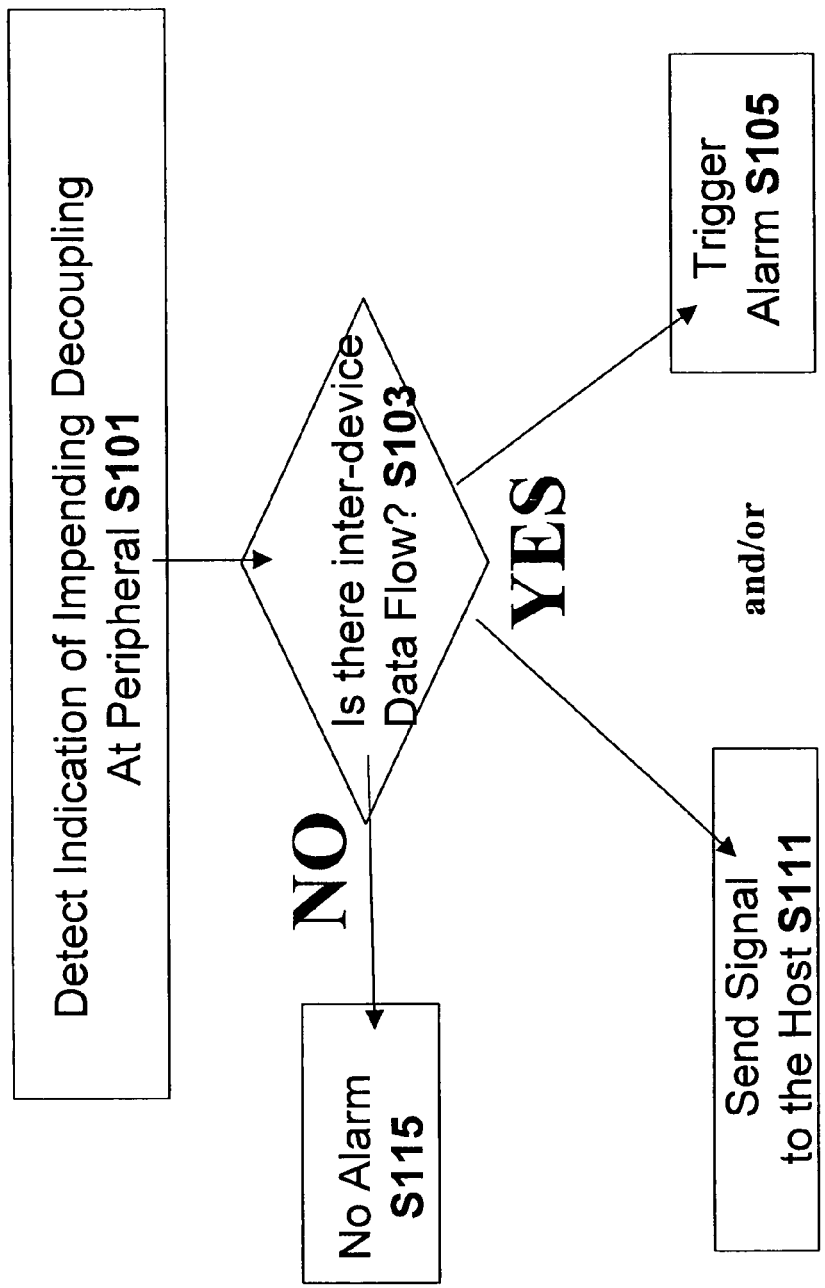
FIGS. 4A-4C provide flowcharts of exemplary techniques for conditionally alerting a user of an impending decoupling in accordance with inter-data flow.

Thus, in the example of FIG. 4A, upon detecting S101 an indication of the impending decoupling (i.e. by the onboard detector 130), it is determined S103 if there is an inter-device dataflow. In one non-limiting example, when there is a request to transfer data from the host 110 to the peripheral 114 (or vice-versa), a certain 'data flow' flag may be set to 'active' on the host 110 and/or on the peripheral 114. When the particular data transfer is completed, the flag may be set back to 'inactive.' Inspection of the 'data flow' flag allows one to determine if there is inter-device data flow. Other techniques of detecting an inter-device data flow are certainly possible.

In the event that there is such a dataflow, a signal indicating the impending disconnection may be sent to the host S111 (i.e. to trigger a user alert) and/or a device-side alert may be triggered S105.

Figure 4B:
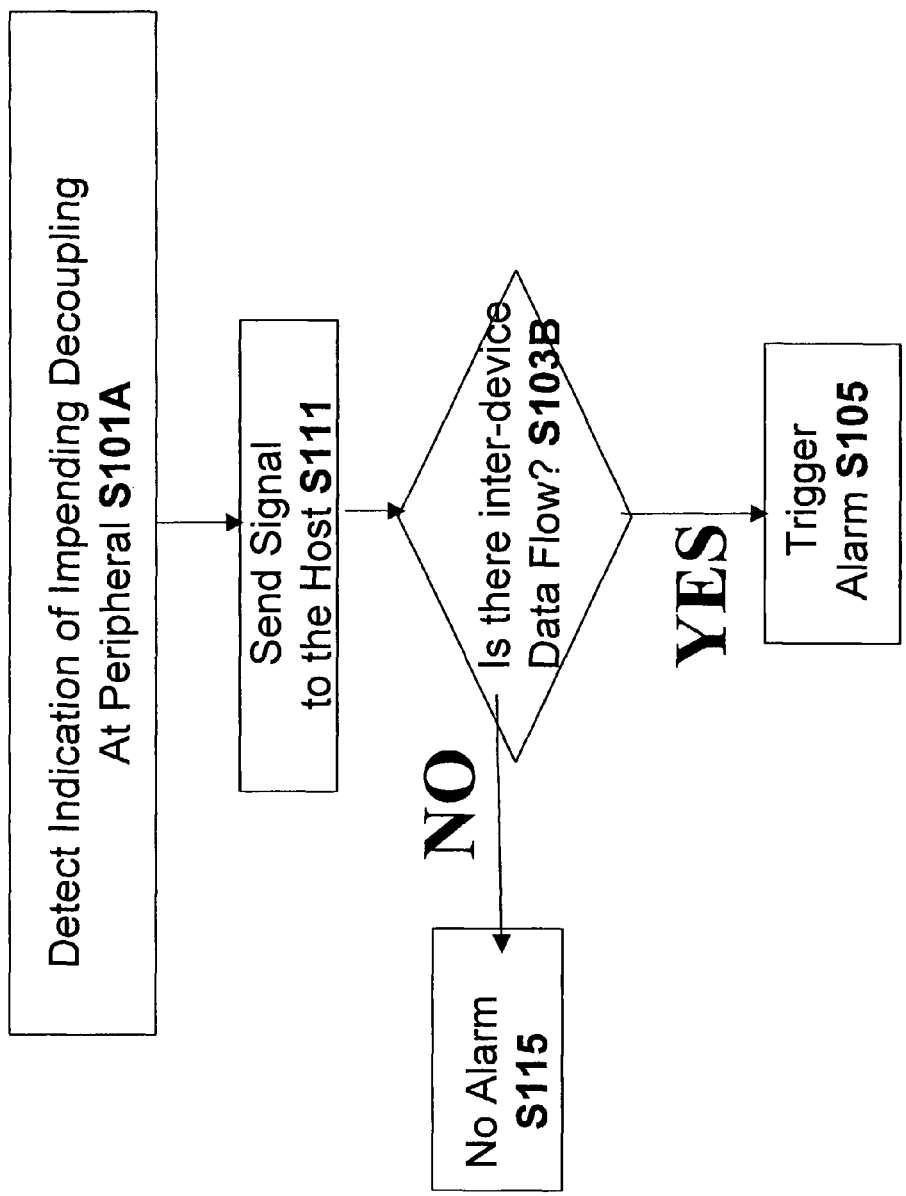

In an alternative implementation described in FIG. 4B, upon detecting S101A an indication of the impending decoupling (i.e. by onboard detector 130A), a signal is sent from the peripheral 114 to host 110. Upon receiving the signal, the host determines if there is an inter-device data flow S103B. If there is such a data flow (or a particular type of data flow), the alert is triggered.

Figure 4C:
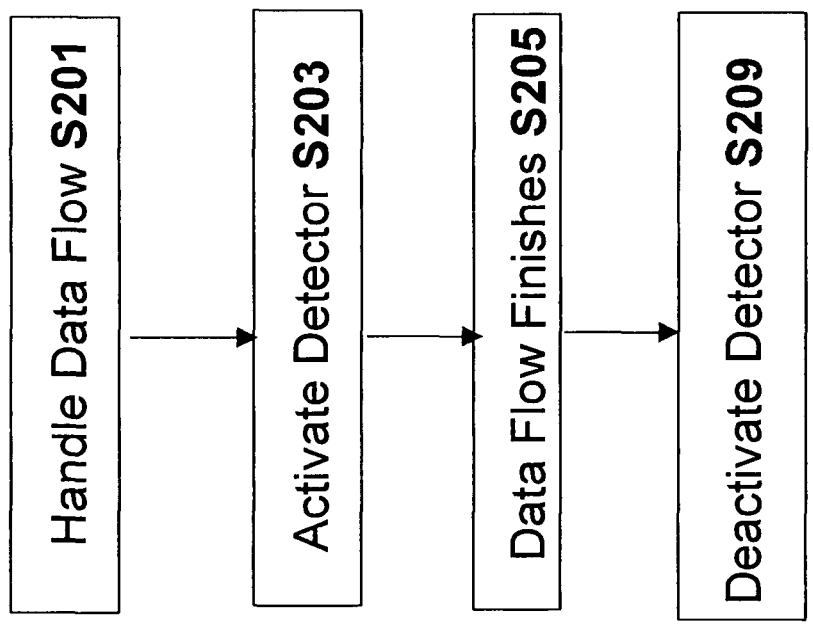

In an alternate implementation illustrated in FIG. 4C, when dataflow is handled S201 between the host 110 and peripheral 114, the onboard detector 130 (i.e. for detecting an impending disconnection) is 'activated' S203. In the absence of such dataflow, the onboard detector 130 is not active (i.e. when the dataflow finishes S205, the detector is deactivated S209). In this example, only if the detector is 'active' can the impending disconnection between the peripheral 114 and host 110 be detected.

A Discussion of Different Techniques for Detecting the Impending Disconnection; A Discussion of Various Response Operations FIG. 5 shows a flowchart of an exemplary detection process of an impending detachment. The process begins when a signal 28, representing an indication from one of possible sensors, is generated by any sensor of the onboard detector 130. Exemplary sensors include but are not limited to latch 20, proximity 22, strain 24.) In the example of FIG. 5, signal 28 triggers an immediate response 34 and continues to send this response until it is determined that indicating that it is safe to disconnect or that the TSD has lost the connection to the host.

In some embodiments, parallel to the visual 40, auditory 42, or tactile 44 responses, the host also activates a damage control module 38 to automatically reduce the damage in case the impending detachment should materialize.

Figure 6A:
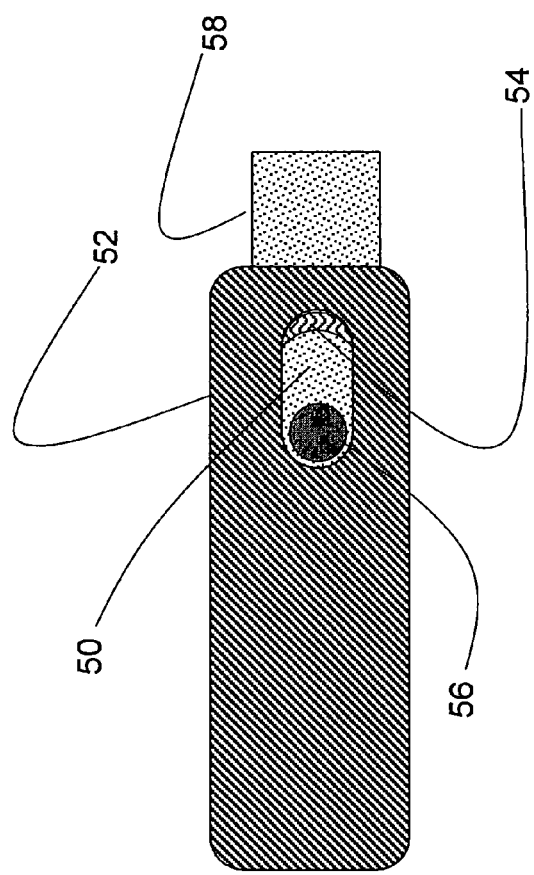
FIG. 6A and FIG. 6B show an exemplary TSD having a latch sensor.
Figure 6B:
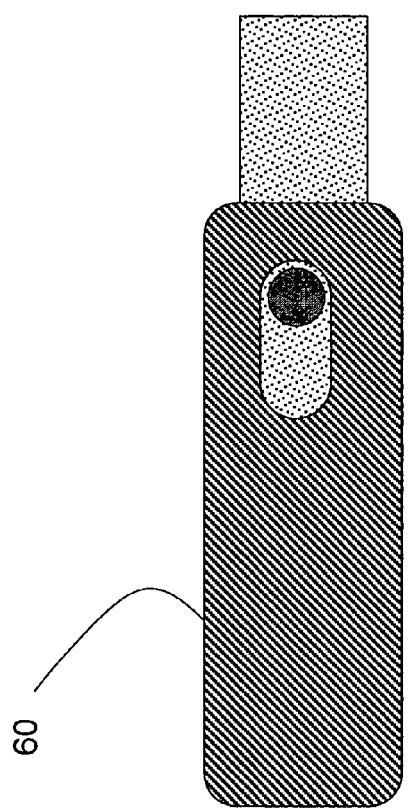

FIGS. 6A-6B show a TSD with an onboard latch sensor. In this embodiment, the TSD body is surrounded by a shell 52 that encompasses the entire body of the TSD. The body includes a stop button 56 within a slide 50, and a pressure sensor or button 54 that indicates impending disconnection. Under normal use, the shell is inset against the USB connector 58, indicating that the device is not being disconnected. When the user attempts to disconnect the device, he pulls the shell until the stop button is flush against the end of the slide 60, where the button 54 is pressed, and the process described in FIG. 5 begins before the state depicted in FIG. 2B is reached.

Figure 7:
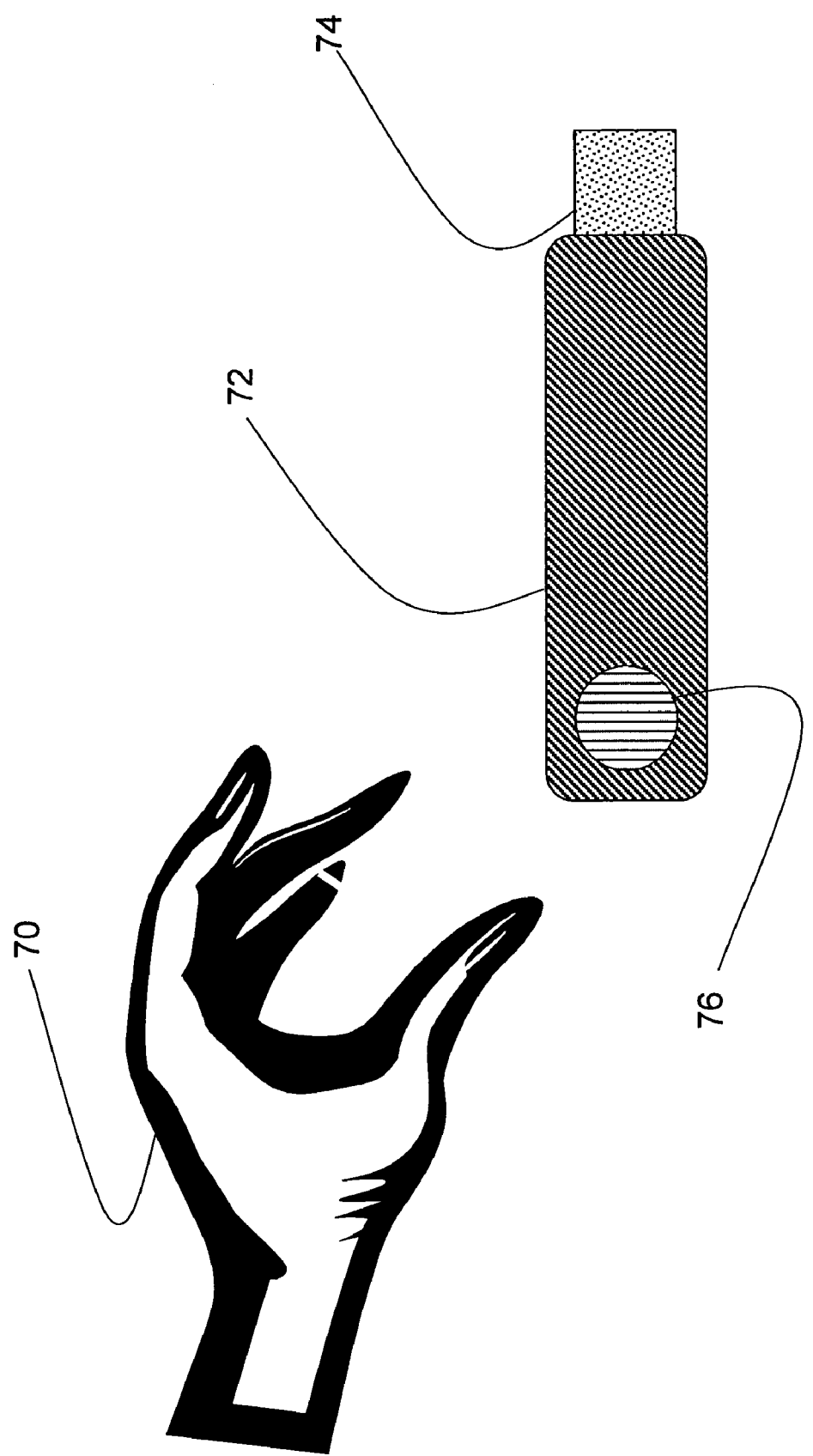
FIG. 7 shows an exemplary TSD having a proximity sensor.

FIG. 7 shows a TSD whose body 72 is equipped with a proximity sensor 76 that senses the proximity of the hand of the user by sensing a change in capacitance to ground or in temperature due to the body heat of the hand of the user. When the user's hand 70 is in proximity to the sensor, the sensor signals the TSD, at which point the process described in FIG. 5 begins.

It is noted that the aforementioned sensor which detects elevated temperature due to body heat is an example of a 'thermal sensor.'

In another example, the 'proximity' sensor includes an optical 'electric eye' sensor which detects when a beam of light is broken, for example, by the user's hand.

Figure 8:
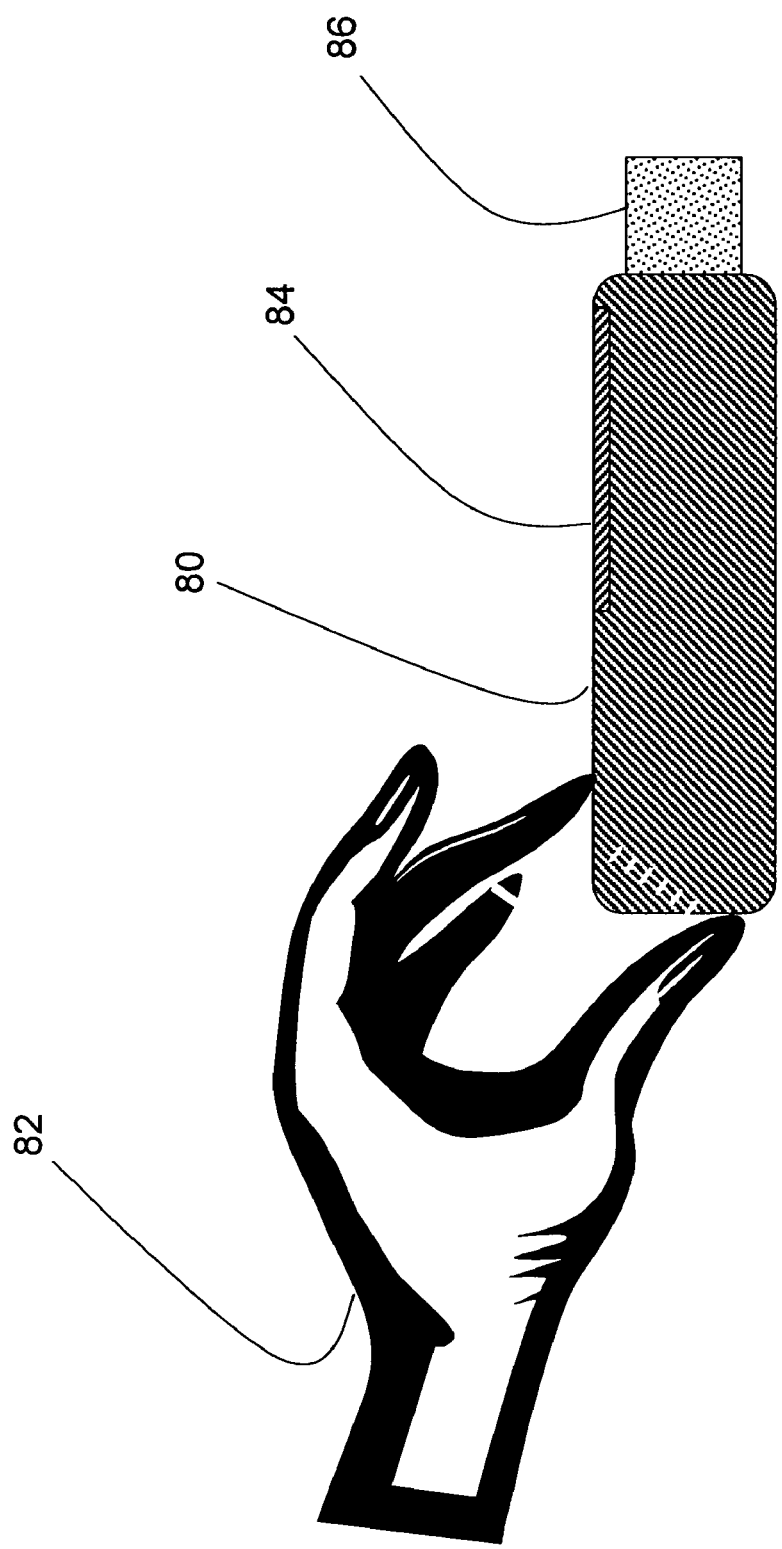
FIG. 8 shows an exemplary TSD having a strain sensor.

FIG. 8 shows a TSD whose body 80 is equipped with a strain sensor, such as a strain gauge or a piezoelectric transducer, for example the "Seismophone" available from Atlas Researches Labs, Hod Hasharon, Israel. When the user's hand 82 grasps the TSD body while it is connected to a host 110 via connector 86 and begins to pull it away from the host, the sensor detects the increased strain and signals the TSD, at which point the process described in FIG. 1 begins.

Figure 9:
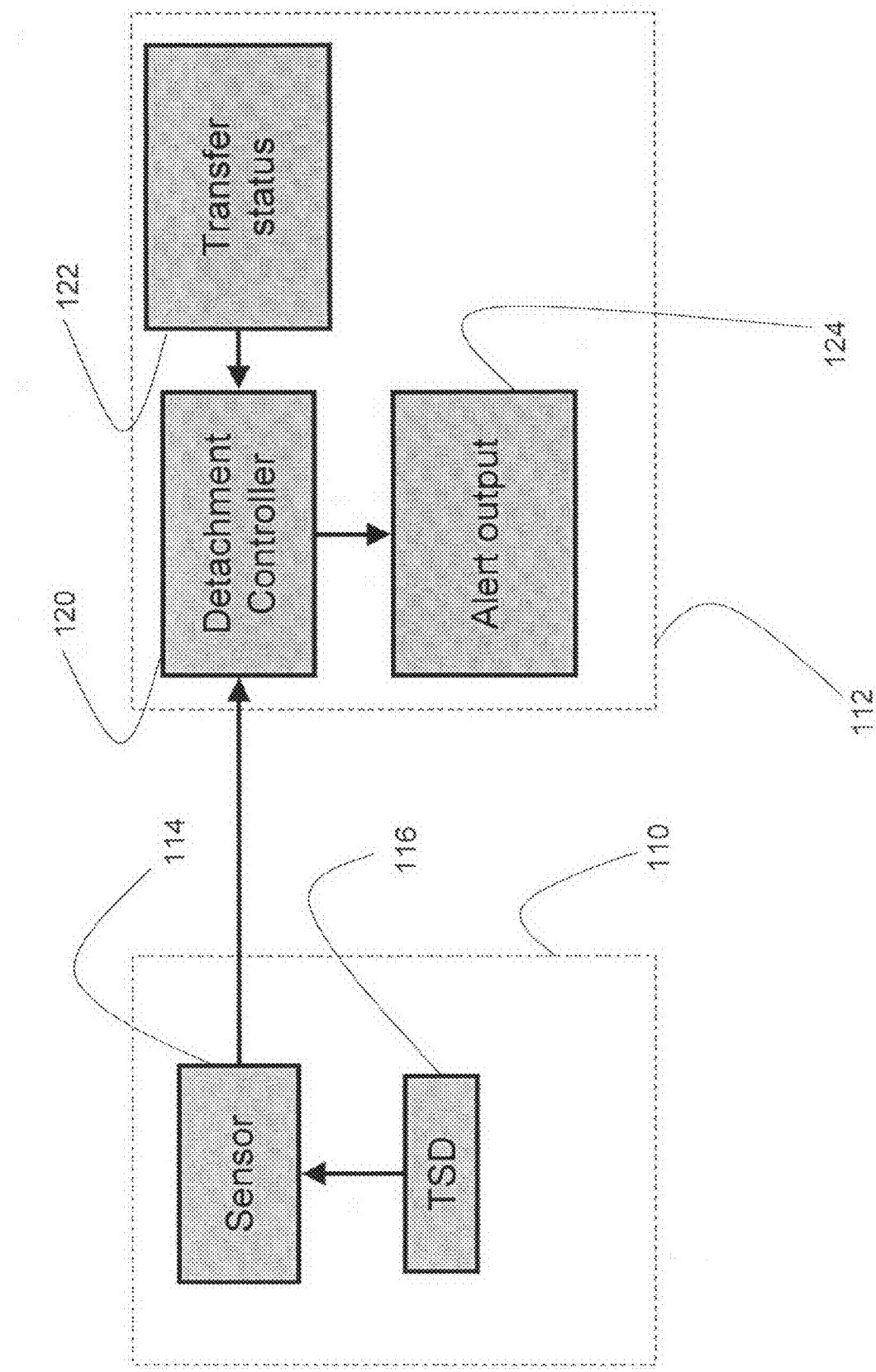
FIG. 9 shows a block diagram of an exemplary user alert response.

FIG. 9 depicts a block diagram showing an exemplary alert response to the user according to one embodiment. The response may be carried out at the peripheral and/or at the host. In one example, when a signal is sent S111 from the TSD 116 to the host 112, the Detachment Controller 120 receives the signal. The Detachment Controller is a software application or device driver residing on the host that interprets the signal and determines if the impending detachment creates a risk to the data. Such risk will be declared if a file is open on the TSD, or if an application is using the TSD. The Detachment Controller 120 responds by alerting the user 124. In one non-limiting example, the user alert will be initiated within less than 400 milliseconds which will allow the user to abort the act of mechanically decoupling the peripheral 114 from the host 110.

Figure 10:
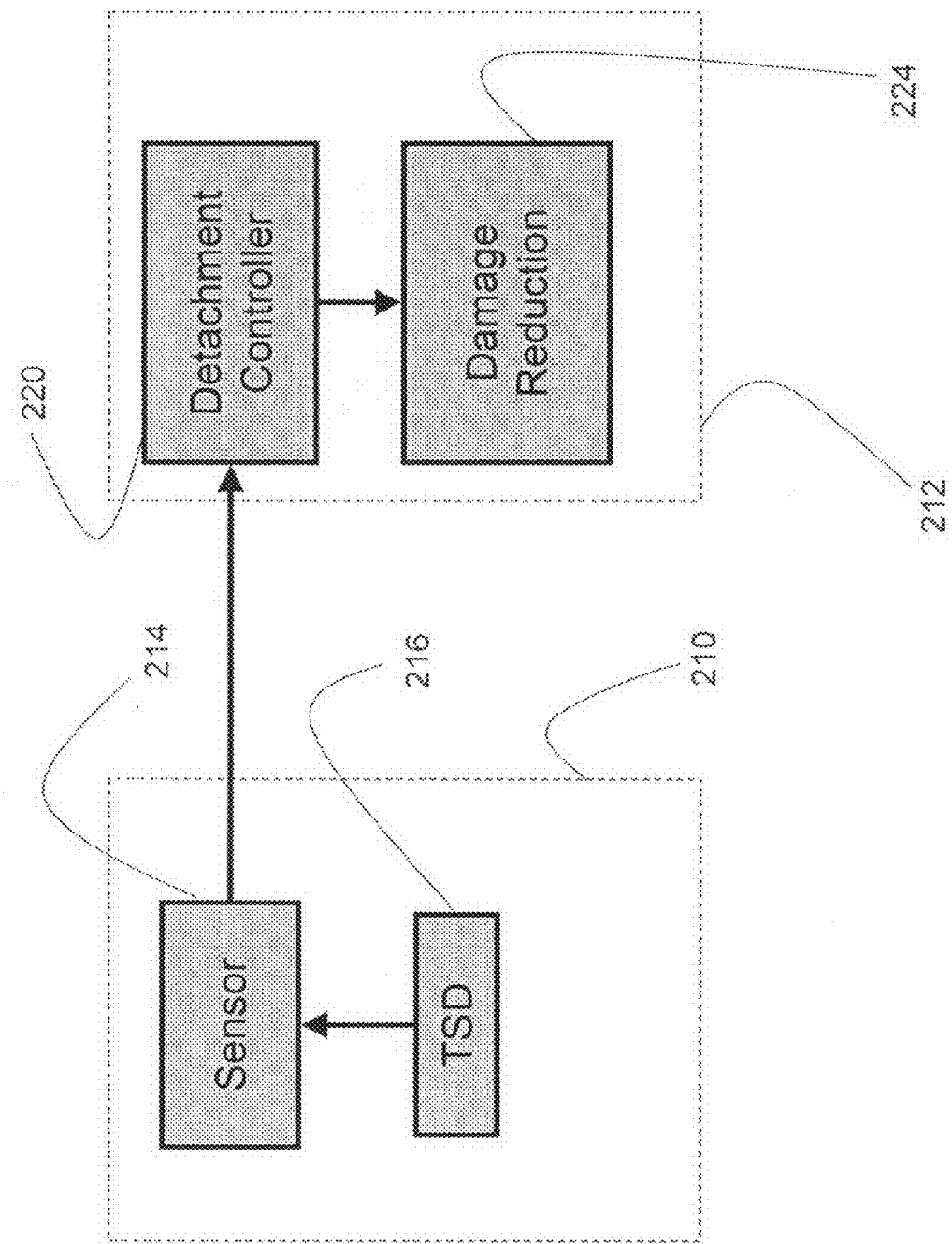
FIG. 10 shows a block diagram of an exemplary damage control response.

FIG. 10 depicts a block diagram showing a damage reduction process according to yet another embodiment. When an alert signal is sent from the TSD 216 to the host 212, the Detachment Controller 220 receives the signal. The Detachment Controller is a software application or device driver residing on the host that interprets the signal and determines if the impending detachment presents a risk to the data. Such a risk will be declared if a file is open on the TSD or if an application is using the TSD. The Detachment Controller 220 responds by triggering the damage reduction process 224. The damage reduction process may attempt to reduce damage by performing one or more of the following actions:

Signaling applications that are determined to be using the device that the TSD is at risk of not being available in the near future.
  Flushing and closing all files on the TSD.
  Proactively preventing new files from opening on the device.
  Notifying any security program running on the host and dependent upon presence of the TSD that the TSD is "about to leave", enabling it to consider temporary enhancement of the security, for example, by increasing the frequency of checking for TSD presence.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

All references cited herein are incorporated by reference in their entirety. Citation of a reference does not constitute an admission that the reference is prior art.

The articles "a" and "an" are used herein to refer to one or to more than one (i.e., to at least one) of the grammatical object of the article. By way of example, "an element" means one element or more than one element.

The term "including" is used herein to mean, and is used interchangeably with, the phrase "including but not limited to.

The term "or" is used herein to mean, and is used interchangeably with, the term "and/or," unless context clearly indicates otherwise.

The term "such as" is used herein to mean, and is used interchangeably, with the phrase "such as but not limited to".

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

What is claimed is:

1. A method of handling impending peripheral device decoupling, comprising:
    detecting at on onboard detector of a peripheral device while electrically coupled to a host-side interface of a host device via a device port of the peripheral device, an impending loss of wired electrical connectivity with the host device, the device port operative for data exchange between a non-volatile memory of the peripheral device and the coupled host device;
    receiving at a controller of the host device, an indication of the detected impending loss of wired electrical connectivity with the peripheral device while the host device is electrically coupled to the peripheral device, the indication being received via the onboard detector of the peripheral device;
    determining by the controller of the host device, in response to the indication of the impending loss of wired electrical connectivity, whether there is a data flow between the host device and the peripheral device;
    determining by a detachment controller of the host device whether the detected impending loss of wired electrical connectivity presents a risk to data in the data flow;
    triggering a damage reduction process in response to determining that the detected impending loss of wired electric connectivity presents a risk to the data;
    providing a user alert at the host device indicating the impending loss of wired electrical connectivity in response to a combination of the indication of the detected impending loss of wired electrical connectivity and determining that there is the data flow between the host device and the peripheral device; and
    ceasing, by the onboard detector of the peripheral device, a monitoring of the impending loss of wired electrical connectivity when there is no data flow between the host device and the peripheral device.

2. The method of claim 1, further comprising:
    providing a user alert at the peripheral device in response to the combination of the indication of the impending loss of wired electrical connectivity and determining that there is the data flow between the host device and the peripheral device.

3. A system for handling impending peripheral device decoupling, comprising:

a peripheral device, the peripheral device comprising:
a non-volatile memory for data storage;
a device port for coupling with a host device and for data exchange between the non-volatile memory of the peripheral device and the coupled host device; and
an onboard detector that is operative, when the peripheral device is coupled with the host device to permit data flow via a wired connection with the device port, to detect an impending loss of wired electrical connectivity between the non-volatile memory of the peripheral device and the host device, wherein the onboard detector is operative to cease, while the peripheral device remains coupled to the host device, a monitoring of the impending loss of electrical connectivity when there is no data flow between the host device and the peripheral device; and the host device, the host device comprising:
a host-side interface operative to electrically couple the host device to the peripheral device;
a controller in communication with the host-side interface, the controller operative to receive from the peripheral device via the onboard detector an indication of a detected impending loss of wired electrical connectivity with the peripheral device while the host device is electrically coupled to the peripheral device, the controller operative to respond to the indication of the detected impending loss of wired electrical connectivity by determining whether there is a data flow between the host device and the peripheral device, the controller operative to provide, while the peripheral device remains coupled to the host device to permit data exchange, an indication that data flow between the host device and the peripheral device has completed;
a detachment controller operative to determine whether the indication of the detected impending loss of wired electrical connectivity presents a risk to data in the data flow, the detachment controller operative to trigger a damage reduction process in response to determining that the impending loss of wired electrical connectivity presents a risk to the data; and
an alert mechanism operative to provide a user alert in response to a combination of the indication of the detected impending loss of electrical connectivity and the determination that there is the data flow between the host device and the peripheral device, wherein no user alert is provided when there is no data flow between the host device and the peripheral device.

4. The host device of claim 3, wherein the damage reduction process includes at least one of:
signaling to one or more applications using the peripheral device that the peripheral device may not be available in the near future;
flushing and closing files on the peripheral device;
preventing new files from opening on the peripheral device; and
notifying one or more security programs on the host device that the peripheral device is about to leave.

5. The system of claim 3, wherein the peripheral device includes:
a signal forwarding mechanism operative to forward the indication of the impending loss of wired electrical connectivity to the host device.

6. The system of claim 5, wherein the signal forwarding mechanism is operative to carry out the forwarding in accordance with a flow of data from the host device to the peripheral device.

7. The system of claim 3, wherein the onboard detector is operative to detect the impending loss of wired electrical connectivity by detecting a change of state of an electric switch.

8. The system of claim 3, wherein the onboard detector is operative to detect at least one of:
an approach of a physical object to one or more of:
the peripheral device; and
a coupling location between the peripheral device and the host device; and
a proximity of a physical object to one or more of:
the peripheral device; and
the coupling location.

9. The system of claim 3, wherein the onboard detector includes at least one sensing element selected from the group consisting of a proximity detector, a stress sensor, a strain sensor, an electromechanical sensor, a piezoelectric transducer, a thermal sensor, and an optical sensor.

10. The system of claim 3, wherein the onboard detector is operative to detect at least one of a mechanical motion parameter, a mechanical stress parameter, a mechanical strain parameter, and an applied pressure parameter.

11. The system of claim 3, wherein the onboard detector detects the impending loss of wired electrical connectivity without user input.

12. The system of claim 3, wherein the peripheral device includes:
an onboard user alert mechanism that is operative to provide a user alert in response to the combination of the indication of the detected impending loss of electrical connectivity and the determination that there is the data flow between the host device and the peripheral device.

13. The system of claim 3, wherein the onboard detector of the peripheral device includes:
a sensor that detects a change in capacitance.

14. The system of claim 3, wherein the onboard detector includes:
a sensor that detects a change in temperature.

* * * * *